(12) United States Patent
MacCormack et al.

(10) Patent No.: US 6,434,295 B1
(45) Date of Patent: Aug. 13, 2002

(54) SIDE COUPLED PUMPING OF DOUBLE CLAD FIBER GAIN MEDIA

(75) Inventors: Stuart MacCormack, Mountain View; Vincent G. Dominic; Robert G. Waarts, both of Fremont, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/483,032

(22) Filed: Jan. 13, 2000

Related U.S. Application Data

(60) Provisional application No. 60/115,911, filed on Jan. 14, 1999.

(51) Int. Cl.[7] ................................................ G02B 6/26
(52) U.S. Cl. ................................................... 385/27
(58) Field of Search ........................... 372/6, 96, 70, 372/71; 385/27, 39, 31, 147

(56) References Cited

U.S. PATENT DOCUMENTS

| 5,108,183 | A | * | 4/1992 | Fling et al. | 356/350 |
| 5,761,234 | A | * | 6/1998 | Craig et al. | 372/75 |
| 5,864,644 | A | * | 1/1999 | DiGiovanni et al. | 385/43 |
| 5,999,673 | A | * | 12/1999 | Valentin et al. | 385/43 |
| 6,167,075 | A | * | 12/2000 | Craig et al. | 372/75 |
| 6,181,466 | B1 | * | 1/2001 | Franzoso et al. | 359/341 |

* cited by examiner

Primary Examiner—Akm E. Ullah
(74) Attorney, Agent, or Firm—Allen, Dyer, Doppelt, Milbrath & Gilchrist, P.A.

(57) ABSTRACT

All-fiber coupling architectures include at least one fiber gain media, e.g. a fiber amplifier or a fiber laser, providing for the coupling light from one or more multi-wavelength pump sources propagating in a multimode core fiber at multiple points along a double clad fiber or at least at one point along multiple double clad fibers having their inner claddings fused to the multimode core fiber. The latter arrangement provides for a low cost utility multi-signal fiber amplifier for telecommunication applications.

23 Claims, 3 Drawing Sheets

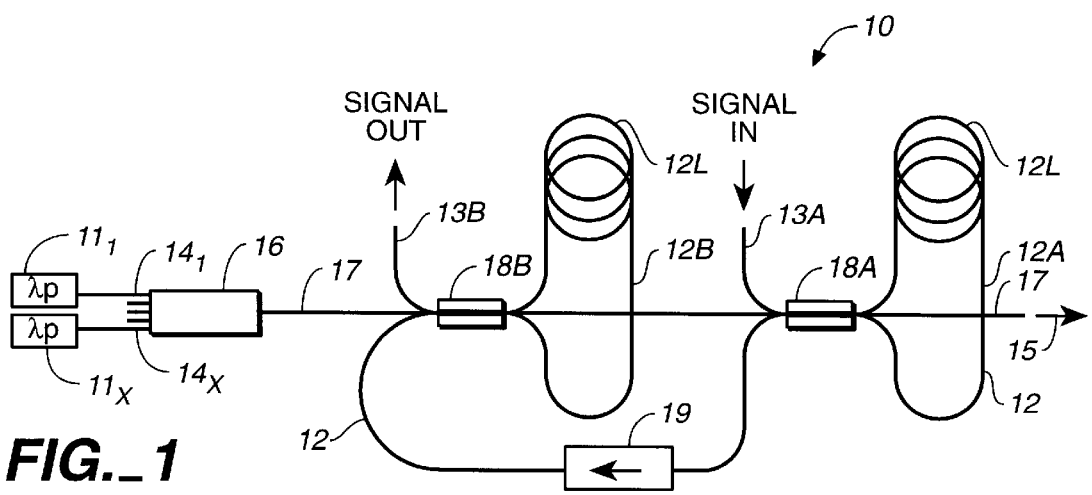
FIG._1
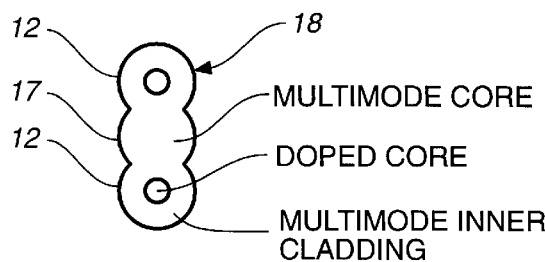
FIG._1A
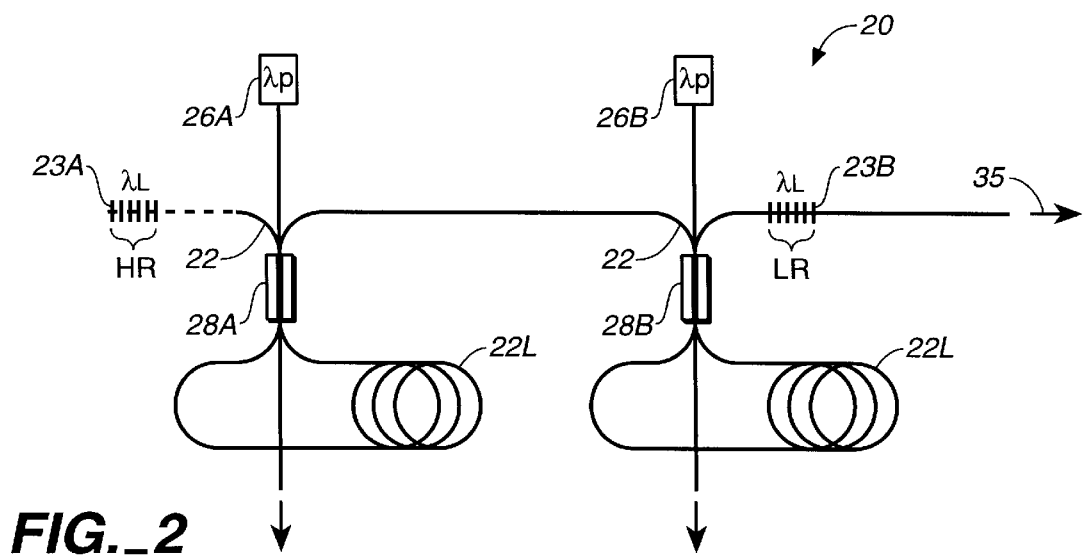
FIG._2

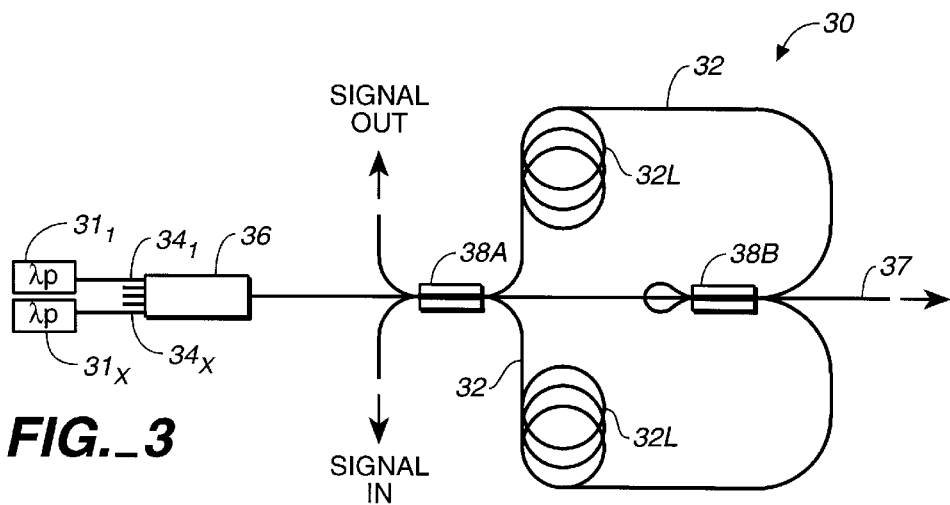
FIG._3
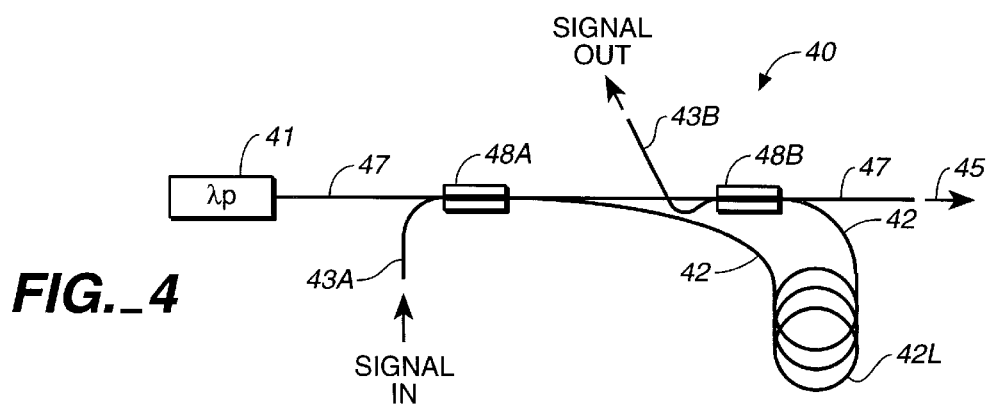
FIG._4
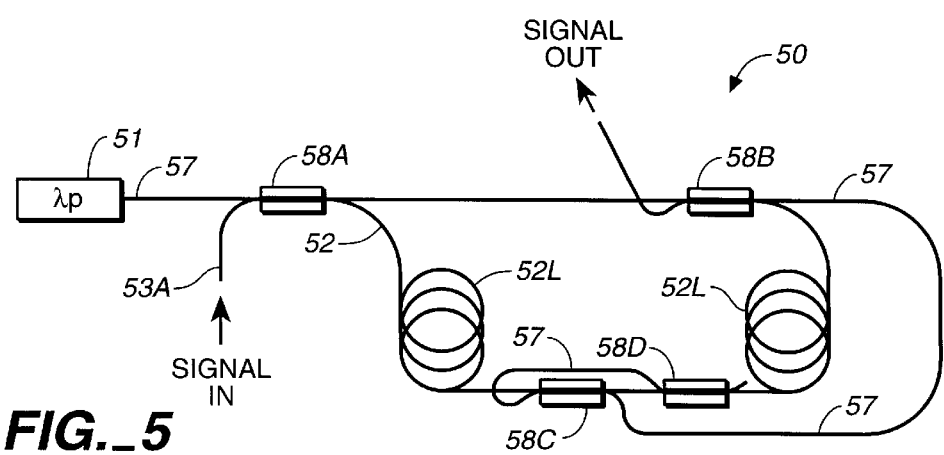
FIG._5

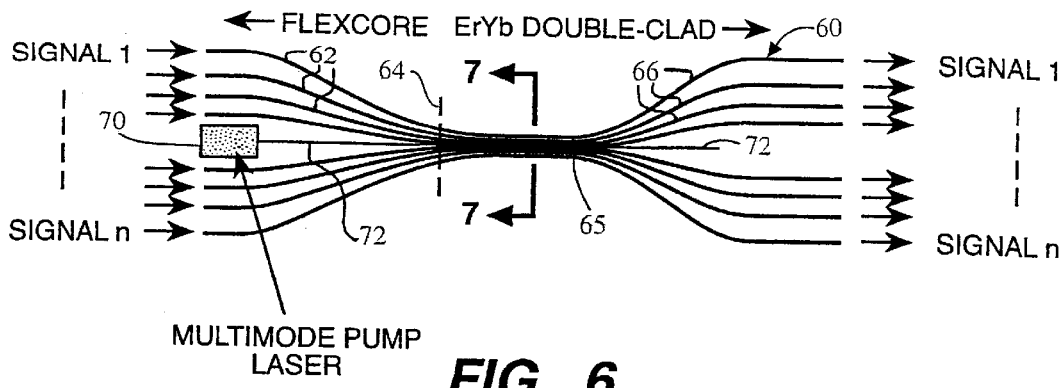
FIG._6
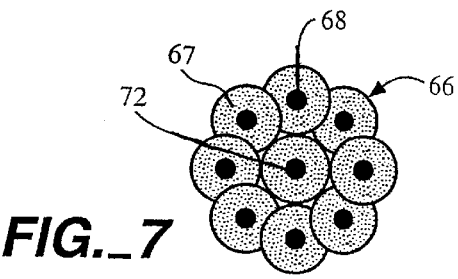
FIG._7
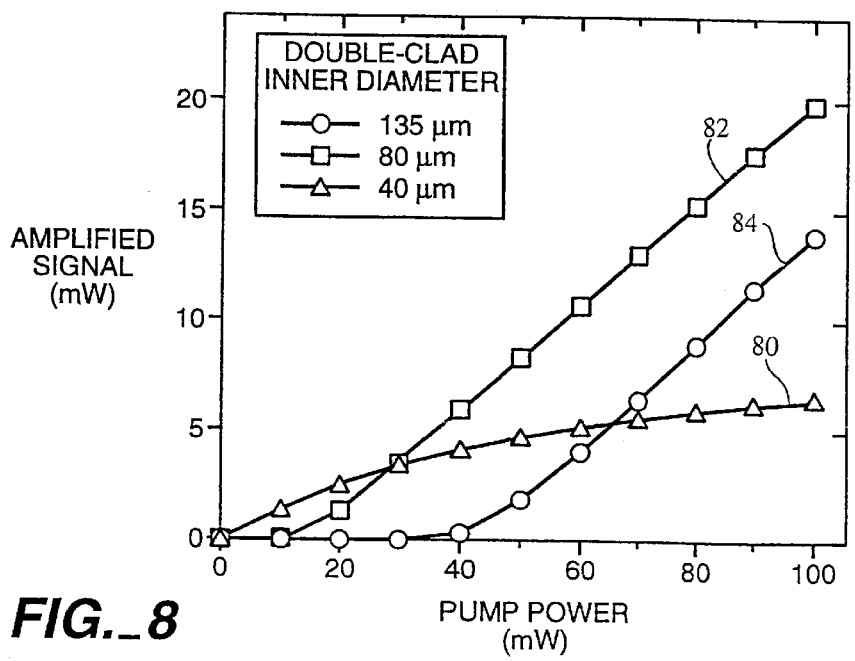
FIG._8

SIDE COUPLED PUMPING OF DOUBLE CLAD FIBER GAIN MEDIA

CROSS REFERENCE TO RELATED APPLICATION

This application claims priority benefits of prior filed copending provisional application Serial No. 60/115,911, filed Jan. 14, 1999, which is incorporated herein by its reference.

FIELD OF THE INVENTION

This invention relates generally to coupling of light into optical fibers and more particularly the coupling of pump light from a multi-wavelength pump source or sources into one or more double clad fibers, which fiber or fibers may include an active element in the core.

BACKGROUND OF THE INVENTION

Doped double clad fibers have come into use providing for higher output power from fiber amplifiers and fiber lasers than can be achieved from employing a doped single mode fiber. With the larger inner pump cladding of the double clad fiber, high power multimode laser diodes can be employed to provide for coupling large amounts of pump power into the inner cladding, allowing the scaling of fiber amplifier powers to much higher levels than those available from a conventional single mode fiber amplifier. The multimode nature of these multi-wavelength sources, however, precludes the use of fused WDM couplers for combining the pump and signal into the fiber amplifier. In cases of employing such multi-mode sources, an optical lens system may be employed to couple the multimode light into an input fiber having a high numerical aperture (NA). However, higher optical losses are a result of such free-space optical coupling systems.

An all-fiber fused approach for coupling the multimode pump light into the fiber would be preferred over such free space optical coupling architecture because it provides for a more robust arrangement, comparatively easier alignment and is less expensive to manufacture. It would also be preferable to pump the fiber gain media with a number of discrete fiber coupled lasers in a distributed pump architecture where the respective pump lasers may be individually addressed. Such a pumping arrangement has advantages in providing for thermal distribution and increased lifetime of the discrete laser diodes as compared to employing a single laser bar as a pump source. Also, an all-fiber fused approach would permit the use of a low cost utility amplifier system for amplifying a plurality of communication signals via a plurality of fused coupled fiber amplifiers with a single high multimode laser pump source.

SUMMARY OF THE INVENTION

According to this invention, all-fiber coupling architectures include at least one fiber gain media, e.g. a fiber amplifier or a fiber laser, providing for the coupling light from one or more multi-wavelength pump sources propagating in a multimode core fiber at multiple points along a double clad fiber or at least at one point along multiple double clad fibers having their inner claddings fused to the multimode core fiber. The latter arrangement provides for a low cost utility multi-signal fiber amplifier for telecommunication applications.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic illustration of a first embodiment of a fused coupler architecture comprising this invention.

FIG. 1A is a cross sectional view taken along the line 1A—1A of the fused coupler architecture of FIG. 1.

FIG. 2 is a schematic illustration of a second embodiment of a fused coupler architecture of this invention as applied in a fiber laser system.

FIG. 3 is a schematic illustration of a third embodiment of a fused coupler architecture of this invention as applied in a fiber amplifier system.

FIG. 4. is a schematic illustration of a fourth embodiment of a fused coupler architecture of this invention with improved coupling efficiency.

FIG. 5 is a schematic illustration of a fifth embodiment of a fused coupler architecture of this invention with even further improved coupling efficiency.

FIG. 6 is a schematic illustration of a sixth embodiment of a fused coupler architecture of this invention as applied in an amplifier array.

FIG. 7 is a cross sectional view taken along the line 7—7 of the fused coupler architecture of FIG. 6.

FIG. 8 is a graphic illustration of the performance of a double clad fiber amplifier as a function of the double clad inner cladding diameter.

DETAILED DESCRIPTION OF THE PREFERRED EMBODIMENTS OF THE INVENTION

Reference is now made to FIG. 1 illustrating a first proposed coupling scheme comprising this invention. Multistage fiber amplifier system 10 provides for more efficient multimode light coupling into the inner cladding of a core-doped double clad fiber which functions as a fiber gain medium, employing novel 3×3 multimode fused couplers. Multistage fiber amplifier system 10 comprises a double clad fiber 12 and an associated pump source comprising a plurality of multimode broad area laser diodes $11_1$–$11_x$ that have respective multimode fiber outputs $14_1$–$14_x$ that are optically combined into a single high NA, multimode fiber 17 via a fused taper fiber bundle or conical taper 16. Pump fiber 17 has a multimode core whose NA and diameter match the NA and diameter of the inner cladding of the double clad fiber 12. As shown in FIG. 1, fiber 12 is continuous and, at fused couplers 18A and 18B, is provided to have two portions of its length fused to multimode pump fiber 17, that is, fiber 17 is sandwiched between two portions of a length of double clad fiber 12 in a configuration illustrated in cross section in FIG. 1A. Suitable rare earth dopants in fiber 12 include Yb or Nd or codoped Er/Yb as known in the art. These fibers may be pumped at wavelengths around 920 nm to 980 nm within the absorption band, for example, of Er/Yb. Shown in FIG. 1 is fiber 12 consisting of two amplifier stages 12A and 12B separated by an optical isolator 19.

Fused couplers 18A and 18B are formed by heating fibers 12 and 17 as parallel-aligned over their coupling portions in a jig and are, then, fused together, ensuring that the cores of the double clad fibers 12 are not perturbed. A cross-section of the resulting fused couplers 18A and 18B is illustrated in FIG. 1A. At the output from the first fused region of coupler 18A, the pump light, λp, will be equally split between the three fibers 12-17-12, so that two-thirds of the pump light will be coupled into the double clad fiber 12. The length of double-clad fiber loops 12L are chosen so that the combined pump light, λp, is substantially absorbed as the coupled-in pump light travels around both loops, typically about 10 dB to 13 dB in each loop. The light remaining in the pump fiber travels on to a second multimode coupling module 18B where again two-thirds of the pump light is coupled into double-clad fiber 12 and the remaining one-third of the pump light, which is now $\frac{1}{9}^{th}$ of the total input pump power, may be used to pump a third amplifier stage or simply dumped at 15. This two-stage pump light coupling architecture 10 results in approximately 90% pump light coupling efficiency into double clad fiber 12.

A signal injected at input 13A into the core of the double clad fiber 12 will experience gain around 1100 nm for Yb-doped fiber and around 1550 nm for ER/Yb-doped fiber. The signal output is at 13B, which is notably closer to the pump source 14 than coupler 18A. For optimal amplifier performance, the signal should be injected into fiber 12 farthest from pump source 14 so it can be amplified to a level sufficient to fully saturate the second power stage or later amplifier stages of the multistage amplifier system 10. Optical isolator 19 is employed between the first and second respective stages 12A and 12B eliminate the buildup of ASE in the backward direction. If the injected signal is sufficiently high to fully saturate the amplifier gain in the first stage 12A, then isolator 19 would be unnecessary.

An alternate application for the fused coupler architecture shown in FIG. 1 is employment of this architecture in a fiber laser system 20 illustrated in FIG. 2. Fiber Bragg gratings 23A and 23B are spliced onto the input and output ends of double clad fiber 22 to define a fiber laser resonator. Fiber grating 23A is of high reflectance (HR) at the lasing wavelength, λL. Fiber grating 23B is partially reflective at the grating wavelength (low reflectance, LR, at the lasing wavelength, λL) in order to provide laser output at 35. To further scale the output power provided from the fiber laser 22, multiple pumping modules 26A and 26B are located at different positions along the single length of double clad fiber 22 where the light is coupled into fiber 22 via fused couplers 28A and 28B in the same manner as explained in connection with fused couplers 18A and 18B in FIG. 1. The length of double clad fiber loops 22L are chosen so that the combined pump light, λp, is substantially absorbed as the coupledin pump light via couplers 28A and 28B travels around the loops 22L.

Improved coupling efficiency can be achieved by using a multimode pump fiber diameter that is smaller than the double clad fiber inner cladding diameter. The coupling efficiency from the multimode pump fiber into the double clad fiber is given approximately by:

Coupling efficiency=1/[1+(pump fiber area/2×double clad fiber area)]

=$1/[1+(R_P^2/2R_{DC}^2)]$

As an example, a 125 gm diameter pump fiber coupled to a 200 μm diameter double clad fiber provides a 72% coupling efficiency, assuming the numerical apertures of the fibers are matched. However, the smaller the diameter of the pump fiber, the lower the number of pump lasers that can be combined into the multimode pump fiber. This is because a fiber can guide a certain brightness which is equal to its NA times its cross-sectional area. Typical double-clad fibers, have an NA of 0.45 and diameters ranging from about 125 μm to about 200 μm. Pump lasers generally start with approximately 0.15 NA and a 100 μm diameter. Therefore, the output from about 36 lasers can fit into an inner cladding of a standard 200 μm double clad fiber whereas only about 14 lasers can fit into an inner cladding of double clad fiber having a diameter of 125 μm.

Another embodiment of fused coupler architecture is shown in FIG. 3, comprising fiber amplifier system 30 involving a two stage amplifier in which both amplifier stages are equally pumped in terms of the provided pump power. In FIG. 3, the output from the multimode laser pump sources $31_1$–$31_x$ are coupled respectively into multimode fibers $34_1$–$34_x$ and are combined into a single high NA, multimode fiber 37 via a fused taper fiber bundle or conical taper 36. Double clad fiber 32 is continuous and, at fused couplers 38A and 38B, is provided to have two portions of its length fused to multimode pump fiber 37, that is, fiber 37 is sandwiched and fused between two portions of a length of double clad fiber 32 in a manner previously illustrated in connection with FIG. 1A. The length of double-clad fiber loops 32L are chosen so that the combined pump light, μp, is substantially absorbed as the coupled-in pump light travels around both loops. Substantially equal amounts of fiber 32 are on opposite sides of couplers 38A and 38b so that equal amounts of pump power are transferred into both amplifier loops 32L. Thus, this design is advantageous in a power amplifier scheme where gain spectrum matching of the two amplifier stages is an important goal. Also, in a fiber laser architecture where fiber gratings are provided at the ends of fiber 32 to form a laser cavity in a manner as explained in connection with FIG. 2, equal pumping of the two stages is likely to yield the best operational slope efficiency for the fiber laser.

As indicated above, the foregoing architectures of FIGS. 1–3 provide for pumping double clad fibers employing 3×3 multimode fused couplers. These fused fiber pump couplers provided up to 66% coupling of the incident pump light into a double clad fiber per coupler. In FIG. 4, a further improvement in the design of the fused coupler is shown which allows for a 75% coupling efficiency. A further extension of this design approach will provide for a 94% coupling efficiency of pump light into a double clad fiber employing relatively simple 2×2 fused fiber couplers as illustrated in FIG. 5.

In fiber amplifier system 40 in FIG. 4, the pump light from multimode pump source 41 is delivered via a multimode pump fiber 47 to a fiber amplifier comprising double clad fiber 42. Pump source 41 may be a single source or multiple combined sources such as illustrated in FIG. 1. Pump fiber 47 has a multimode core whose NA and diameter match the inner cladding of the double clad fiber 42. A first 2×2 fused coupler 48A is designed so that the input pump light is equally split between pump fiber 47 and the double clad fiber 42. The pump fiber 47 and its propagating pump light is continuous to a second 2×2 fused coupler 48B where the remaining pump is split again between the pump fiber 47 and the same double clad fiber 42. The net effect of the two couplers 48A and 48B is to couple a total of 75% of the pump light from pump fiber 47 into the inner cladding of the double clad fiber 42. The length of double clad fiber loop 42L is chosen so that the combined pump light, μp, is substantially absorbed in the doped fiber core as the coupled-in pump light in the inner cladding of fiber 42 travels through the looped fiber. In fabricating these multimode couplers, care should be taken to ensure that the single mode core of the double clad fiber 42 is not perturbed by the fusing process in fabricating couplers 48A and 48B.

In the simplest form of this fiber amplifier design, the remaining 25% of the pump light is simply dumped out of pump fiber 47, as shown at 45 in FIG. 4. In a more elaborate design, this remaining pump power can be utilized by providing additional pump light coupling into the same double clad fiber 42 employing an additional pair of 2×2 fused couplers 58C and 58D as shown in fiber amplifier system 50 of FIG. 5. In FIG. 5, the pump light from pump source 51 is delivered via a multimode pump fiber 57 to a fiber amplifier comprising double clad fiber 52 via four 2×2 couplers 58A–58D, rather than two such couplers. A first 2×2 fused coupler 58A is designed so that the input pump light is equally split between the transmitted pump fiber 57 and the double clad fiber 52. The pump fiber 57 is continuous to a second 2×2 fused coupler 58B where the pump is again split 50/50 between the pump fiber 57 and the double clad fiber 52. The pump fiber 57 is further continuous to a third and a fourth 2×2 fused coupler 58C and 58D where the pump is again respectfully split 50/50 between the pump fiber 57 and the double clad fiber 52. As a result, the remaining pump light in the pump fiber 57 is only about 6% so that substantially all the pump light, $\mu p$, is coupled into fiber amplifier 52. As in previous cases, the length of double-clad fiber loops 52L are chosen so that the combined pump light, $\mu p$, is substantially absorbed as the coupled-in pump light travels around both loops 52L. The position of the intermediate 2×2 fused couplers 58C and 58D along the length of fiber 52 can be other than that illustrated in FIG. 5. For example, the spacing between couplers 58C and 58D can be much larger than shown, or the first of the two loops 52L may exist between couplers 58C and 58B.

The fused coupler architectures of FIGS. 4 and 5 may also be employed in the case of fiber lasers as well as fiber amplifiers. The use of the 2×2 fused couplers of FIGS. 4 and 5, instead of 3×3 couplers, are less complex to manufacture since the complexity of coupler fusing and resulting yield and coupled light efficiency increases with each additional fiber provided for forming a fused coupler body. This factor, coupled with the likelihood of increased light coupling efficiency, renders the pumping scheme of FIGS. 4 and 5 potentially more attractive than the pumping architectures of FIGS. 1–3.

Many telecommunication systems, such as all-optical switches and multiplexers, would greatly benefit from a low cost and reduced performance optical amplifier, referred to also as a utility amplifier, for providing optical gain to telecommunication signals. Such a utility amplifier can be employed in an fiber amplifier array such as shown in FIG. 6 where a single high power pump source provides for simultaneous and uniform pumping of a plurality of fiber amplifiers. As shown in FIG. 6, an array of incoming optical signals 1 to n are provided via an array of single mode optical fibers 62. In the embodiment of FIG. 6, the array is shown to total eight fibers but the number of fibers forming the utility amplifier system 60 could vary from two fibers to twenty fibers, for example, depending on the desired application. The signal input fibers 62 are respectively spliced at 64 to cores 68 of double clad fibers 66, i.e., one single mode input fiber 62 is spliced to the core of a double clad fiber 66. As shown in FIG. 7, the double clad fibers 66 comprise an inner cladding 67 surrounding a core 68. Cores 68 are a glass doped with a rare earth active element such as Er or Yb or co-doped with Er/Yb. Inner cladding 67 is a fused silica glass surrounded by a low refractive index polymer outer cladding (not shown). Preferably, fibers 66 are of round geometry and are co-doped with Er/Yb in their cores 68 to function as a utility amplifier 60 in connection with the amplification of telecommunication signals in the 1540 nm to 1565 nm spectrum. The pump fiber 72 to provide pump power to the inner claddings of fiber amplifiers 66 comprises a multimode fiber, such as a polymer cladded fused silica fiber 72 which is coupled to a low cost, broad area semiconductor laser 70, such as a SDL Model 4000 series pump laser module, manufactured by SDL Optics, Inc. of Saanichton, British Columbia, Canada and sold by SDL, Inc. of San Jose, CA, USA. Such a multimode pump source 70, for example, may operate in the wavelength range of about 910 nm to 980 nm and having an output power of about 1 W. It should be noted that source 70 may be comprised of a plurality of such pump sources different wavelengths with their outputs WDM combined or may be a fiber laser.

In order to prepare the coupling region 65 of amplifier system 60, the polymer coating is stripped from a section of the double clad fibers 66 adjacent to their input ends where they are fused at 64 to input fibers 62, and the polymer coating is removed from an intermediate section of the multimode pump fiber 72. The regions of the amplifier fibers 66 striped of the polymer coating are arranged around the stripped pump fiber 72 in a manner as illustrated in FIG. 7 and the fibers are heated and fused together. The heating and fiber pulling parameters to form this fused coupling are chosen to ensure good melting among the fiber inner claddings 67 and the silica fiber 72 but insufficient induce any additional optical losses in their fiber cores 68 or otherwise perturb the core with the fusing process. The fused region of fibers 66 and 72 may be, for example, about 2 cm to about 3 cm long. This process is quite similar to the process employed in making fused 2×2 and 3×3 optical couplers and is an extension of the side pumping coupling of double clad fiber lasers and amplifiers illustrated in previous embodiments.

The pump light in pump fiber 72 is divided between the double clad fibers inner claddings according to the relative area of each double clad fiber. Thus, in the case of eight amplifier fibers as shown in FIG. 7 with pump and double clad fiber cladding diameters equal to about 100 $\mu$m, approximately 90% of the incident pump light will be transferred to inner claddings 67 of double clad fibers 66. This coupling efficiency can be further improved by pre-tapering the pump delivery fiber 72 to reduce its cross-sectional area. The pump light is absorbed in the cores 68 of fibers 66 providing optical gain in the 1540 nm to 1565 nm spectrum. The optical signals 1 to n to be amplified are coupled from the single mode input fibers 62 into cores 68 of double clad fibers 66 and the amplified signals, experiencing about 15 dB of gain, exit from the ends of fibers 66 where that may be spliced into respective single mode fibers or coupled into another optical component such as an add/drop filter, a multiplexer or an optical switch.

The optical-to-optical efficiency of the amplifier system 60 is strongly dependent on the pump power required to achieve transparency in the system. This transparency power is roughly proportional to the cross sectional area of the double clad fiber inner cladding. FIG. 8 shows the calculated performance for one of the eight Er/Yb core doped fiber amplifiers 66 as a function of the inner cladding diameter. This data is based upon a 0.5 mW, 1550 nm input signal with a fiber length chosen to ensure about 10 dB pump light absorption in the fiber core. Three 10 different inner cladding diameters are employed, to wit, a 40 $\mu$m inner cladding diameter fiber 80, a 80 $\mu$m inner cladding diameter fiber 82 and a 125 $\mu$m inner cladding diameter fiber 84. As can be seen from the curves in FIG. 8, for optimum gain efficiency, the inner cladding diameter of double clad fibers 66 should be in the range of about 60 µm to about 100 µm, but this optimum diameter will depend upon operational requirements and pump power in a given fiber amplifier. As an example, in system 60 illustrated in FIG. 6, a single SDL optics 4000 series pump laser module pumping an array of eight double clad fiber amplifiers 66 would result in a 16 dB gain and 13 dBm saturated output power from each of the fiber amplifiers 66.

It should be noted that in connection with the embodiment in FIG. 6, more than one multimode fiber/multiple double clad fiber fused coupler 65 can be provided along the length of multimode core fiber 72. For example, a second such coupler 65 can be provided farther down the lengths of double clad fiber amplifiers 66 to introduce any remaining pump light into the inner claddings 67 of these fibers.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications as that are within the spirit and scope of the following claims.

What is claimed is:

1. A fiber bundle device comprising:
   a multimode pump source;
   a multimode fiber having a multimode core coupled to receive the output from the pump source;
   a plurality of double clad fibers coupled with each of their cores coupled to receive a respective input signal, said double clad fibers having an inner cladding;
   a portion of said double clad fibers bundled about a portion of said multimode fiber wherein said double clad fiber inner claddings are fused to said mode fiber core for coupling pump light from said multimode fiber into said double clad fiber inner claddings.

2. The fiber bundle device of claim 1 wherein said double clad fibers include a rare earth doped core.

3. The fiber bundle device of claim 2 wherein the cores of said double clad fibers are doped with Er, Yb, or Er/Yb.

4. The fiber bundle device of claim 1 wherein said multimode pump source is a semiconductor laser source.

5. The fiber bundle device of claim 1 wherein said one or more of said double clad fibers function as a fiber gain medium.

6. The fiber bundle device of claim 1 wherein said multimode pump source is a fiber laser.

7. The fiber bundle device of claim 1 wherein said coupled cores of said double clad fibers are respective coupled to a single mode fiber carrying a propagating communication signal.

8. The fiber bundle device of claim 1 wherein a second portion of said double clad fibers, spatially disposed from the first mentioned portion of said double clad fibers, are bundled about a second portion of said multimode fiber, spatially disposed from the first mentioned portion of said multimode fiber, for coupling additional pump light from said multimode fiber into said double clad fiber inner claddings.

9. The fiber bundle device of claim 1 wherein output ends of said double clad fibers are coupled to an optical component.

10. The fiber bundle device of claim 9 where in said optical component is an add/drop filter, a multiplexer or an optical switch.

11. The fiber bundle device of claim 1 wherein said multimode fiber is pre-tapered to reduce its cross sectional area prior to fusing with said double clad fibers.

12. An optical fiber gain architecture comprising:
    a multimode optical fiber having a multimode core coupled to receive the output of a multimode pump source;
    a double clad optical fiber having inner and outer claddings and an inner core through which an optical signal is transported; and
    at least one optical fiber coupler that couples pump light into multiple portions of said inner cladding of said double clad optical fiber from at least one respective portion of said multimode optical fiber, a respective one of said at least one optical fiber coupler containing a respective portion of said multimode optical fiber fused between said separate portions of the inner cladding of said double clad optical fiber.

13. The optical fiber gain architecture according to claim 12, wherein said at least one optical fiber coupler includes a first optical fiber coupler that couples pump light into first and second portions of said inner cladding of said double clad optical fiber from a first portion of said multimode optical fiber, said first optical fiber coupler containing said first portion of said multimode optical fiber fused between said first and second portions of the inner cladding of said double clad optical fiber; and
    a second optical fiber coupler that couples pump light into third and fourth portions of said inner cladding of said double clad optical fiber from a second portion of said multimode optical fiber, closer to said multimode pump source than said first portion of said multimode optical fiber, said second optical fiber coupler containing said second portion of said multimode optical fiber fused between said third and fourth portions of the inner cladding of said double clad optical fiber.

14. The optical fiber gain architecture according to claim 13, wherein said double clad optical fiber has an input coupled to receive said optical signal for transport therefrom to said first portion of the inner cladding of said double clad optical fiber of said first optical fiber coupler, and an output coupled to output an amplified optical signal from said fourth portion of the inner cladding of said double clad optical fiber of said second optical fiber coupler.

15. The optical fiber gain architecture according to claim 13, wherein said double clad optical fiber has an input coupled to receive said optical signal for transport therefrom to said third portion of the inner cladding of said double clad optical fiber of said second optical fiber coupler, and an output coupled to output an amplified optical signal from said fourth portion of the inner cladding of said double clad optical fiber of said second optical fiber coupler.

16. An optical fiber architecture comprising:
    a first multimode optical fiber having a multimode core coupled to receive the output of a multimode pump source therefor;
    a second multimode optical fiber having a multimode core coupled to receive the output of a multimode pump source therefor;
    a double clad optical fiber having inner and outer claddings and an inner core through which optical energy is transported;
    a first optical fiber coupler that couples pump light from a portion of said first multimode optical fiber into first and second portions of said inner cladding of said double clad optical fiber, said first optical fiber coupler containing said portion of said first multimode optical fiber fused between said first and second portions of the inner cladding of said double clad optical fiber; and a second optical fiber coupler that couples pump light from a portion of said second multimode optical fiber into third and fourth portions of said inner cladding of said double clad optical fiber that is spaced apart from said first portion of said double clad optical fiber, said second optical fiber coupler containing said portion of said second multimode optical fiber fused between said third and fourth portions of the inner cladding of said double clad optical fiber.

17. The optical fiber architecture according to claim 16, wherein a fifth portion of said double clad optical fiber spaced apart from said first optical fiber coupler contains a first Bragg grating, and wherein a sixth portion of said double clad optical fiber spaced apart from said second optical fiber coupler contains a second Bragg grating to define a laser resonator.

18. An optical fiber gain architecture comprising:

a multimode optical fiber having a multimode core coupled to receive the output of a multimode pump source;

a double clad optical fiber having inner and outer claddings and an inner core through which an optical signal is transported;

a first optical fiber coupler that couples pump light into a first portion of said inner cladding of said double clad optical fiber from a first portion of said multimode optical fiber, said first optical fiber coupler containing said first portion of said multimode optical fiber fused with said first portion of the inner cladding of said double clad optical fiber;

a second optical fiber coupler that couples pump light into a second portion of said inner cladding of said double clad optical fiber from a second portion of said multimode optical fiber, said second optical fiber coupler containing said second portion of said multimode optical fiber fused with said second portion of the inner cladding of said double clad optical fiber;

a third optical fiber coupler that couples pump light into a third portion of said inner cladding of said double clad optical fiber from a third portion of said multimode optical fiber, between said first and second portions of said multimode optical fiber, said third optical fiber coupler containing said third portion of said multimode optical fiber fused with said third portion of the inner cladding of said double clad optical fiber; and wherein said double clad optical fiber has an input coupled to receive said optical signal for transport therefrom to one of said first and second portions of the inner cladding of said double clad optical fiber, and an output coupled to output an amplified optical signal from the other of said first and second portions of the inner cladding of said double clad optical fiber.

19. The optical fiber architecture according to claim 18, further including a fourth optical fiber coupler that couples pump light into a fourth portion of said inner cladding of said double clad optical fiber from a fourth portion of said multimode optical fiber, between said first and second portions of said multimode optical fiber, said third optical fiber coupler containing said fourth portion of said multimode optical fiber fused with said fourth portion of the inner cladding of said double clad optical fiber.

20. The optical fiber architecture according to claim 19, further including a fourth optical fiber coupler that couples pump light into a fourth portion of said inner cladding of said double clad optical fiber from a fourth portion of said multimode optical fiber, between said second and third portions of said multimode optical fiber, said fourth optical fiber coupler containing said fourth portion of said multimode optical fiber fused with said fourth portion of the inner cladding of said double clad optical fiber.

21. An optical fiber gain architecture comprising:

a multimode optical fiber having a multimode core coupled to receive pumping energy from a multimode pump source;

a double clad optical fiber having inner and outer claddings and an inner core through which an optical signal applied to an input thereof is transported to an output thereof;

first through N optical fiber couplers, where N is greater than two, spatially distributed at first through N sequential locations in the direction of signal transport through said double clad optical fiber, and being operative to couple pump light into first through N portions of said inner cladding of said double clad optical fiber from respectively different portions of said multimode optical fiber, each optical fiber coupler containing a respective portion of said multimode optical fiber fused with a respective portion of the inner cladding of said double clad optical fiber; and wherein said input of said double clad optical fiber is upstream, in a signal transport direction sense, of said first optical fiber coupler and said output of said double clad optical fiber is downstream, in said signal transport direction sense, of said Nth optical fiber coupler, and said pumping energy from said multimode pump source is coupled to said Nth optical fiber coupler prior to being coupled to another optical fiber coupler downstream of said first optical fiber coupler.

22. The optical fiber architecture according to claim 20, wherein N is greater than three.

23. The optical fiber architecture according to claim 20, wherein said first through N optical fiber couplers comprise first, second, third and fourth optical fiber couplers, and wherein said pumping energy from said multimode pump source is coupled to said optical fiber couplers in accordance with the sequence of said first, fourth, second and third optical fiber couplers.

* * * * *

UNITED STATES PATENT AND TRADEMARK OFFICE
CERTIFICATE OF CORRECTION

PATENT NO.   : 6,434,295 B1
DATED        : August 13, 2002
INVENTOR(S)  : MacCormack et al.

It is certified that error appears in the above-identified patent and that said Letters Patent is hereby corrected as shown below:

Column 3,
Line 48, "coupledin" should read -- coupled in --

Column 7,
Line 34, "said mode fiber" should read -- said multimode fiber --
Line 48, "respective coupled" should read -- respectively coupled --

Signed and Sealed this

Third Day of December, 2002

JAMES E. ROGAN
*Director of the United States Patent and Trademark Office*